J. J. OLING.
EXTENSION CAR STEP.
APPLICATION FILED JUNE 27, 1908.

961,002.

Patented June 7, 1910.

2 SHEETS—SHEET 1.

Witnesses:
Harry R. Leelits
R. A. White

Inventor:
John J. Oling.
By Charles Oling
Atty.

J. J. OLING.
EXTENSION CAR STEP.
APPLICATION FILED JUNE 27, 1908.
961,002.
Patented June 7, 1910.
2 SHEETS—SHEET 2.
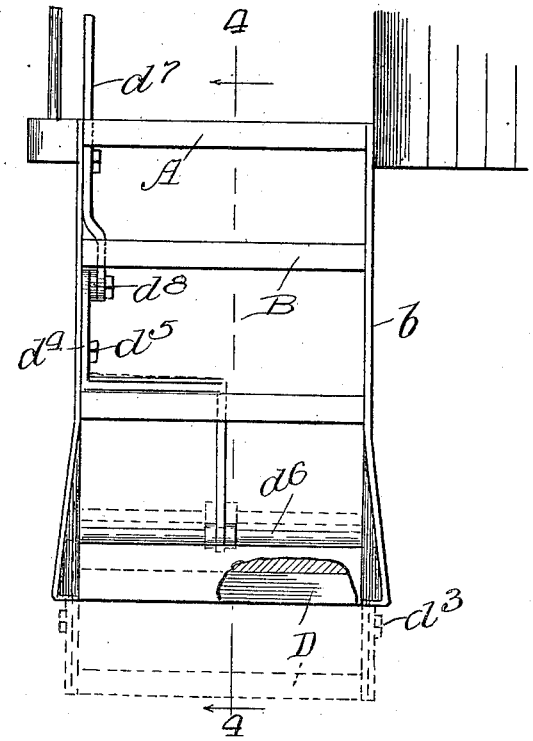
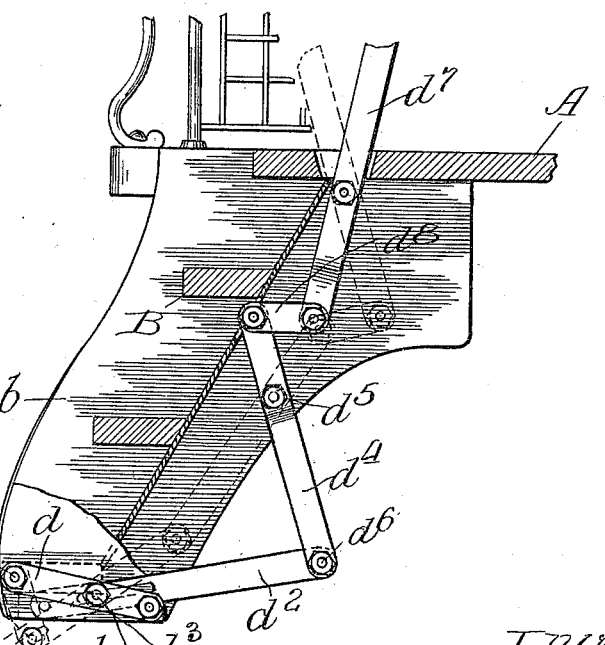

UNITED STATES PATENT OFFICE.

JOHN J. OLING, OF HARVEY, ILLINOIS.

EXTENSION CAR-STEP.

961,002.  Specification of Letters Patent.  Patented June 7, 1910.

Application filed June 27, 1908. Serial No. 440,743.

*To all whom it may concern:*

Be it known that I, JOHN J. OLING, a citizen of the United States, and a resident of the city of Harvey, in the county of Cook and State of Illinois, have invented certain new and useful Improvements in Extension Car-Steps; and I do hereby declare that the following is a full, clear, and exact description of the same, reference being had to the accompanying drawings, and to the letters of reference marked thereon, which form a part of this specification.

Passenger car steps as ordinarily constructed are of a height suitable for a relatively low platform. In many instances, however, the platform being lacking or of a height approximately of the sidewalk level, it is necessary for the porter to place a stool to serve as an additional step to enable the passenger either to enter the car or to alight therefrom conveniently. In such cases the distance between the bottom of the lower step and the walk is something more than twice the height of a step and in consequence, such additional assistance is necessary. Of course, where a somewhat elevated platform is provided, such assistance is not required and the passenger can usually step easily from the platform to the lower step.

The object of this invention is to provide an extension step adapted when not in use to be supported and concealed beneath the bottom stationary step and adapted by the the use of exceedingly simple mechanism of being projected downwardly to afford an additional step, thus obviating the use of the porter's stool at stations or elsewhere.

It is also an object of the invention to afford an exceedingly cheap, simple and durable device of the class described adapted when not in use to occupy very small space and in fact, to be entirely concealed from view.

It is finally an object of the invention to afford an exceedingly strong, and rigid, though very quickly adjustable device of the class described, whereby the step may be projected for use or retracted very quickly.

The invention consists in the matters hereinafter described and more fully pointed out and defined in the appended claims.

Figure 1:
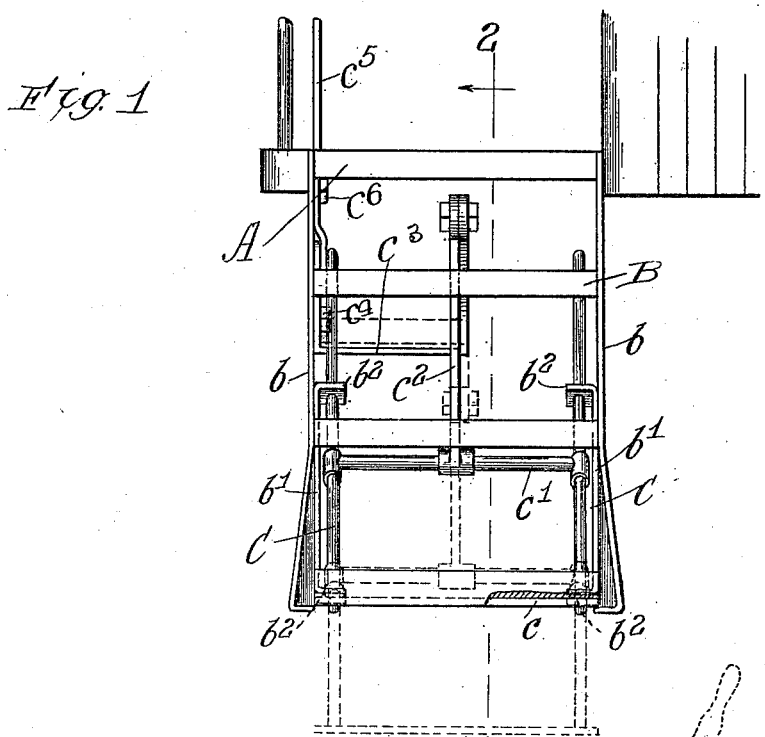
Figure 2:
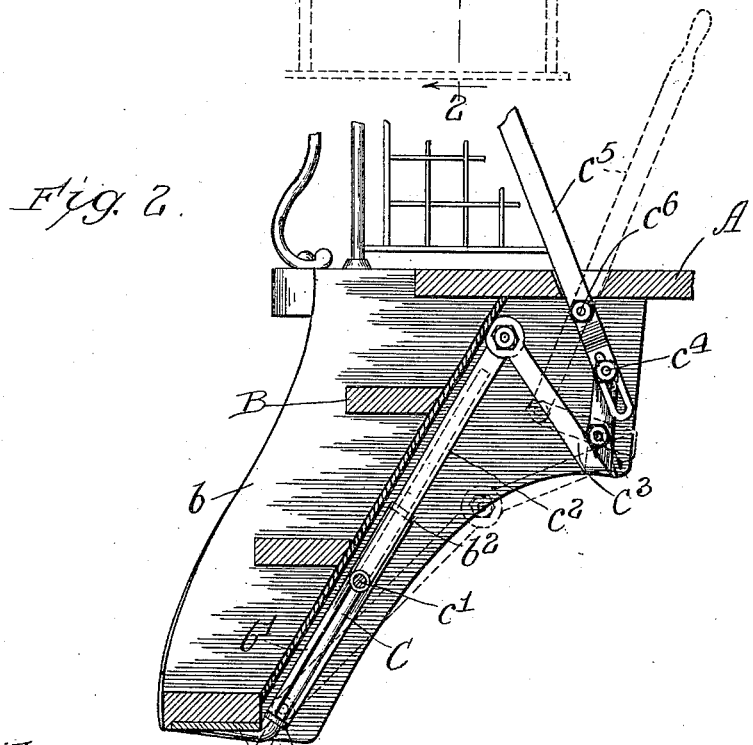

In the drawings: Figure 1 is a front elevation of a device embodying my invention showing the same applied to a Pullman car step and extended in dotted lines. Fig. 2 is a section on line 2—2 of Fig. 1. Fig. 3 is a view similar to Fig. 1, but of a slightly modified actuating mechanism. Fig. 4 is a section on line 4—4 of Fig. 3.

As shown in the drawings: A, indicates the platform, and B, the stationary car steps, which are constructed and supported as usual to afford the requisite rigidity for the use required. Bolted on the inner side of each riser $b$, is a metallic strap $b'$, which lies close behind the back of the steps and is provided at the upper and the lower ends thereof with inwardly turned flanges $b^2$, having apertures therethrough affording eyes through which extend the slide rods C, which, as shown, are cylindric and at their lower ends are bent forwardly and rigidly secured by bolting, riveting, or other suitable means to the metallic step $c$, which is slightly less in width than the width of the stationary steps and is adapted, when the step is elevated, to fit into a recess in the bottom of the step, as shown in Fig. 2, and thereby to be concealed.

Rigidly connecting the guide rods C, near their middle is a transverse bar $c'$. Pivotally connected on said connecting bar $c'$, is an arm or lever $c^2$, which extends upwardly from the center thereof and pivotally engaged at the upper end of said lever, is a bent lever $c^3$, the other end of which extends in close relation with one of the risers $b$, of the stationary steps and is provided with a wrist pin $c^4$, therein which engages in a longitudinal slot in the actuating lever $c^5$. Said actuating lever, as shown, is fulcrumed or pivoted upon a pivot bolt $c^6$, above the slotted end thereof, permitting the free end of said lever to be actuated, as shown in full lines or in dotted lines in Fig. 2, and with the consequent actuation of the step to raise or lower the same.

In the construction shown in Figs. 3 and 4, the step instead of being projected straight downward, as in the construction just described, is projected downwardly and swung outwardly. The mechanism for accomplishing this is as follows: The step D, is pivotally engaged at its rear edge and ends upon a link $d$, the upper end of which is pivotally engaged upon a pivot bolt $d'$, set in its end near the front edge of the lower step. Pivotally engaged on the forward edge of the extension of the step D, is a link $d^2$, which is slotted longitudinally from near its lower end upwardly and through which extends a pivot bolt $d^3$, secured in the link or bar $d$.

Pivotally engaged at the outer end of the link or bar $d^2$, is a lever $d^4$, which is fulcrumed on one of the risers by means of a pivot bolt $d^5$, said lever $d^4$, being connected as shown in Fig. 3, with a transverse connecting bar $d^6$ which engages the lever $d^2$, at each end of the step and being provided with a bend or turn therein, as shown in Fig. 4, to enable said lever to be fulcrumed on the riser. Pivotally engaged on the riser as before described is a lever $d^7$, corresponding with the lever $c^5$, before described, and as shown, the ends of the lever $d^4$, and the ends of the lever $d^5$, are connected by means of a link $d^8$.

The operation of these constructions is substantially identical. When the lever $c^5$, shown in Figs. 1 and 2, is thrown inwardly to the position shown in dotted lines in Fig. 2, the bent lever $c^3$, is actuated to the position shown in dotted lines in said figure, thus forcing the bar $c^2$, downwardly, and bringing the extension step $c$, to the position shown in dotted lines in Fig. 2. In this instance, it is obvious that the eyes in the straps $b'$, guide the guide rods C, and permit only a downward and outward movement of the step by said rod sliding through the eyes. When the lever is thrown back to the position shown in full lines in Figs. 1 and 2, the rod or bar $c^2$, assumes the position shown in Fig. 2, thus necessitating the upward movement of the step bringing the same just beneath the first stationary step and entirely concealing the same from view. Inasmuch as all the mechanism is concealed from view behind the back mounting of the steps, it follows that all that is observable when the step is not in use is the hand lever $c^5$.

In the construction shown in Figs. 3 and 4, the step is also concealed below the lower stationary step when not in use and the lever $d^7$, in that case remains in the position shown in full lines in Fig. 4. When it is desired to extend the step, however, the lever is thrown to the position shown in dotted lines in Figs. 3 and 4, with the effect of throwing the bottom portion of the lever $d^4$, outwardly and extending the slotted link $d^2$, thus carrying the front portion of the extension step downwardly and outwardly, and inasmuch as the rear portion of the step is supported on the link $d^3$, this of course, follows, inasmuch as the length of the link is such that the step D, must in whatever position it is supported whether extended or retracted, remain in parallel relation with the lower stationary car step.

Inasmuch as the step may be instantaneously retracted and normally occupies no space lower than the bottom of the usual lower stationary step, it follows that railway standards cannot at all be affected and cannot at all affect the value of this device, inasmuch as the clearance when the step is not in use is exactly the same above the walk or rail as in the usual construction of steps, the extension only being intended for use when the train is standing still.

This construction obviates entirely the use of the porter's stool in assisting passengers to alight or to enter the car, and thus a very serious danger is avoided as it sometimes occurs that the passenger not stepping fairly upon the stool overturns the same, or the stool may slip upon icy walk.

Of course, I am aware that numerous details of the construction may be varied. I therefore do not purpose limiting this application for patent otherwise than necessitated by the prior art.

I claim as my invention:

1. In a device of the class described an extensible car step, an actuating lever, levers pivotally connected therewith and with the step having a longitudinal slot in the ends adjacent the step, links pivotally connected to the ends of the step and pivot bolts secured to the links and extended through the slots in the levers.

2. In a device of the class described the combination with a car step of an extension step, an actuating lever pivoted to the car step, links pivoted to the car step and to the rear edge of the extension step, a pivot bolt secured to each link, levers pivoted at their ends to the extension step having longitudinal slots therein through which the pivot bolts extend to guide the levers and means connecting the actuating lever and the last named levers.

In testimony whereof I have hereunto subscribed my name in the presence of two subscribing witnesses.

JOHN J. OLING.

Witnesses:
K. E. HANNAH,
CHARLES W. HILLS, Jr.